United States Patent
Lamb et al.

(10) Patent No.: US 7,063,759 B2
(45) Date of Patent: Jun. 20, 2006

(54) SYSTEM AND METHOD FOR CURING COMPOSITE MATERIAL

(75) Inventors: Michael S. Lamb, Lancaster, CA (US); Forrest D. Wyatt, Littlerock, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 10/975,591

(22) Filed: Oct. 28, 2004

(65) Prior Publication Data
US 2005/0056632 A1    Mar. 17, 2005

Related U.S. Application Data

(62) Division of application No. 10/123,710, filed on Apr. 15, 2002.

(51) Int. Cl.
*B29C 73/06* (2006.01)
*B32B 43/00* (2006.01)

(52) U.S. Cl. .......................................... 156/94; 156/282

(58) Field of Classification Search ................ 156/282, 156/94, 497, 381; 432/77, 83, 248, 247, 432/233
See application file for complete search history.

(56) References Cited

U.S. PATENT DOCUMENTS

| | | |
|---|---|---|
| 3,837,965 A | 9/1974 | Mahon et al. |
| 4,352,707 A | 10/1982 | Wengler et al. |
| 4,357,193 A | 11/1982 | McGann et al. |
| 4,430,541 A | 2/1984 | Day, Jr. |
| 4,603,491 A | 8/1986 | Hengle et al. |
| 4,621,995 A * | 11/1986 | Wersosky .................. 425/144 |
| 4,652,319 A | 3/1987 | Hammond |
| 4,694,180 A | 9/1987 | Salisbury et al. |
| 4,717,339 A | 1/1988 | Kersting |

(Continued)

FOREIGN PATENT DOCUMENTS

CA    CA 2 332 341    11/2000

(Continued)

OTHER PUBLICATIONS

European Search Report issued for EP 03 25 2110, dated Nov. 25, 2004.

*Primary Examiner*—George Koch
(74) *Attorney, Agent, or Firm*—Fulbright & Jaworski LLP

(57) ABSTRACT

According to one embodiment of the invention, a system for curing a composite material includes an oven having an inner wall defining an inner chamber, an outer wall defining an outer chamber between the inner wall and the outer wall, a hot air distribution manifold disposed within the inner chamber, a cold air distribution manifold disposed within the outer chamber, and an exhaust chimney having a cold air distribution conduit disposed therein coupled to the outer chamber. The system further includes a hot air supply system coupled to the hot air distribution manifold of the oven that is operable to supply hot air to the hot air distribution manifold, a cold air supply system coupled to the cold air distribution manifold and the cold air distribution conduit that is operable to supply cold air to them, and a plurality of hot air exhaust passages formed in the inner wall of the oven. The hot air exhaust passages are adapted to transport hot air within the inner chamber to the outer chamber.

10 Claims, 5 Drawing Sheets

U.S. PATENT DOCUMENTS

| | | |
|---|---|---|
| D308,976 S | 7/1990 | Gonser |
| 5,078,821 A | 1/1992 | Garvey et al. |
| 5,116,216 A | 5/1992 | Cochran et al. |
| 5,947,718 A * | 9/1999 | Weaver .................. 432/77 |
| 5,975,183 A | 11/1999 | Reis et al. |
| 6,018,614 A | 1/2000 | Garcia et al. |
| 6,206,067 B1 | 3/2001 | Kociemba et al. |
| 6,355,203 B1 | 3/2002 | Charmes et al. |

FOREIGN PATENT DOCUMENTS

| | | |
|---|---|---|
| EP | 0 254 321 | 7/1987 |
| WO | WO 98/45653 | 10/1998 |

* cited by examiner

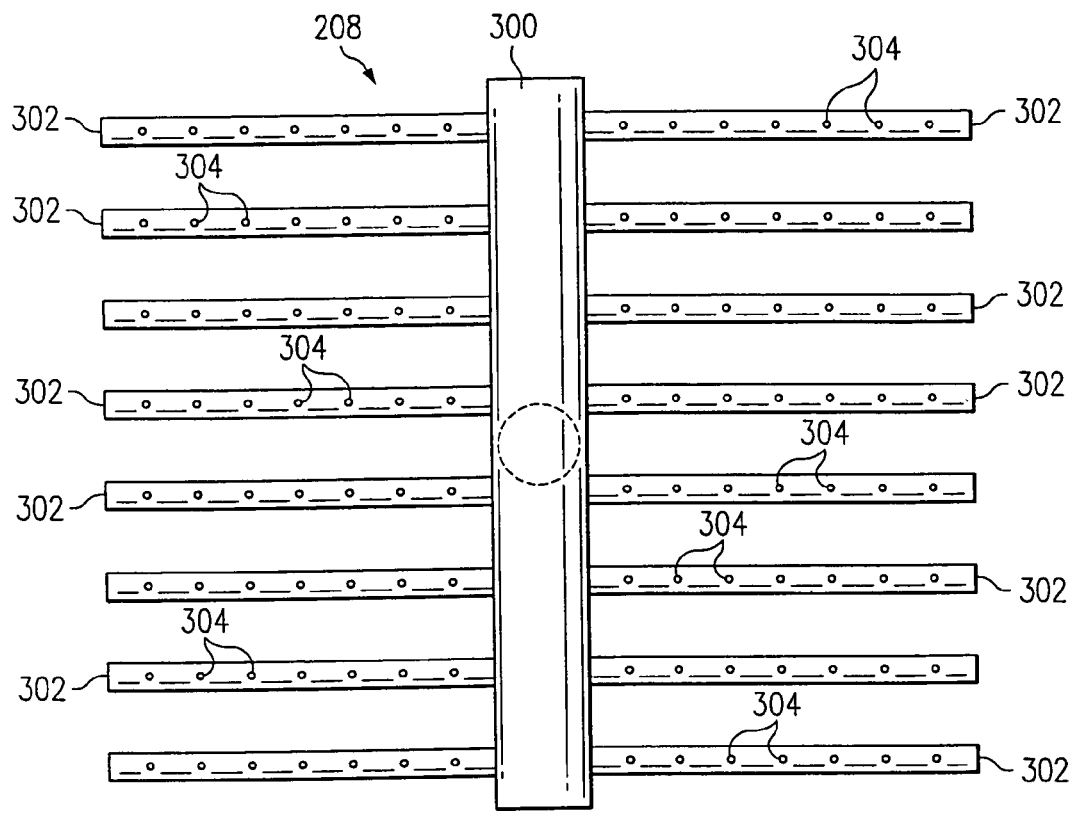
FIG. 3
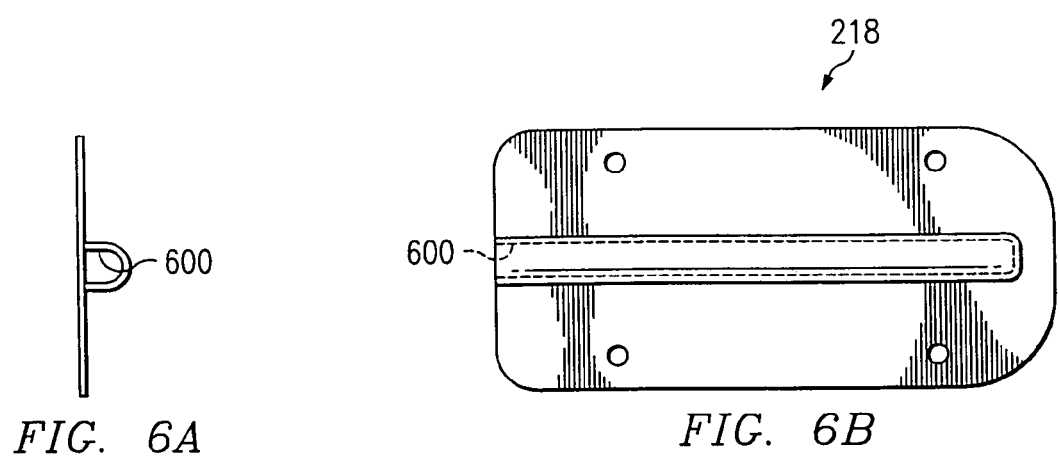
FIG. 6A
FIG. 6B
FIG. 6C

_US 7,063,759 B2_

SYSTEM AND METHOD FOR CURING COMPOSITE MATERIAL

RELATED APPLICATION

This invention is a divisional of co-pending and commonly assigned U.S. patent application Ser. No. 10/123,710, entitled SYSTEM AND METHOD FOR CURING COMPOSITE MATERIAL, filed Apr. 15, 2002, the disclosure of which is hereby incorporated by reference herein.

TECHNICAL FIELD OF THE INVENTION

The present invention relates generally to the field of curing systems and, more particularly, to a system and method for curing composite material.

BACKGROUND OF THE INVENTION

Composite structures are desirable in many industries for many applications. For example, aircraft, space, and land/sea vehicles employ a variety of composite materials in their fabrication. As in the case with other materials, composite materials sometimes have to be repaired. One of the processes typically involved in repairing composite materials is a curing process. A curing process is normally carried out at an elevated temperature. This elevated temperature curing process creates difficulties in repairing composite materials when the composite material is in the form of a composite structure that is already integrated into an aircraft or other vehicle.

One method of repairing composite structures on, for example, an aircraft is to disassemble the aircraft or a portion thereof so that the composite structure may be repaired and subsequently cured in an oven or autoclave. However, this method is often extremely costly and wastes a considerable amount of time when repairing an aircraft.

Another method of curing composite structures on an aircraft is using one or more heating blankets that lay on top of the area of the composite structure that is being repaired. However, some problems associated with the use of heating blankets are that many heating blankets are only good up to a temperature of approximately 500° F. and the heating blankets have a tendency to adhere to the composite materials that are being cured, which may be detrimental to the repair process.

Another method of curing composite materials on an aircraft is to use portable ovens. However, many prior portable ovens that have been used for on-aircraft repair of composite materials have only been adequate for low temperatures, such as a maximum of 260° F.

Another method of curing composite materials on an aircraft is to use a portable system that includes the following: an open-sided oven having an inner chamber, a first insulation surrounding the inner chamber, an outer chamber surrounding the first insulation, and a second insulation disposed on an outside surface of the outer chamber. A thickness of the first insulation and a thickness of the second insulation are such that a surface temperature of an outside surface of the second insulation is no more than 140 degrees Fahrenheit when the inner chamber is at a temperature of at least 500 degrees Fahrenheit. A hot air distribution manifold is disposed within the inner chamber, a cold air distribution manifold is disposed within the outer chamber, and an exhaust chimney having an insulative material coupled to an outside thereof is coupled to the outer chamber. The hot air distribution manifold comprises a plenum, a plurality of dispersion tubes coupled to the plenum, and a plurality of orifices formed in each dispersion tube.

The system further includes a hot air supply system coupled to the hot air distribution manifold of the oven via a hot air supply tube to supply superheated dry air to the hot air distribution manifold, a cold air supply system coupled to the cold air distribution manifold of the oven to supply cold dry air to the cold air distribution manifold, and a plurality of hot air exhaust passages formed in the inner wall of the oven. The hot air exhaust passages are adapted to transport hot air within the inner chamber to the outer chamber. A ratio of a total area of the hot air exhaust passages to a total area of the orifices of the dispersion tubes is equal to at least one.

The system further includes an insulative seal disposed around a perimeter of the inner wall, a bolt and a nut coupling the inner wall and the outer wall, and a retaining plate extending around an inside of the inner chamber adjacent the perimeter to retain the insulative seal in its place. A plurality of hot air guide plates are coupled to the inner wall and disposed within the outer chamber. Each hot air guide plate has a trough adapted to receive hot air from a respective hot air exhaust passage and transport the hot air within the outer chamber. The system further includes an insulative rope disposed between the inner box and the outer box adjacent the first insulation and extending around a perimeter of the inner wall. A handling structure is also coupled to an exterior of the oven.

This portable system has been experimentally tested on B-2 bombers over the past three years.

SUMMARY OF THE INVENTION

According to one embodiment of the invention, a system for curing a composite material includes an oven having an inner wall defining an inner chamber, an outer wall defining an outer chamber between the inner wall and the outer wall, a hot air distribution manifold disposed within the inner chamber, a cold air distribution manifold disposed within the outer chamber, and an exhaust chimney having a cold air distribution conduit disposed therein coupled to the outer chamber. The system further includes a hot air supply system coupled to the hot air distribution manifold of the oven that is operable to supply hot air to the hot air distribution manifold, a cold air supply system coupled to the cold air distribution manifold and the cold air distribution conduit that is operable to supply cold air to them, and a plurality of hot air exhaust passages formed in the inner wall of the oven. The hot air exhaust passages are adapted to transport hot air within the inner chamber to the outer chamber.

Embodiments of the invention provide a number of technical advantages. Embodiments of the invention may include all, some, or none of these advantages. A portable system manufactured according to one embodiment of the present invention meets safety requirements for on aircraft repairs of composite materials. For example, an outside surface of an oven of such a system obtains a maximum temperature that is less than 140 degrees Fahrenheit. This allows aircraft maintenance personnel to work without fear of getting burned. An exhaust temperature of the air exiting the oven obtains a temperature of no more than about 350 degrees Fahrenheit, which is an adequate temperature for avoiding the flammability of materials or other substances. Such a system is also capable of achieving high curing temperatures inside the oven for composite materials on aircraft and sustaining this temperature for long periods.

This significantly reduces cost associated with having to disassemble an aircraft or portions of an aircraft for repairs and eliminates the problems of having to use heating blankets. Such a system may also be small enough and light enough to be handled and transported easily by maintenance personnel.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIG. 3 is a plan view of a hot air distribution manifold of the oven of FIG. 2 according to one embodiment of the present invention;

FIGS. 6A, 6B, and 6C illustrate one embodiment of a hot air guide element associated with the oven of FIG. 2.

DETAILED DESCRIPTION OF EXAMPLE EMBODIMENTS OF THE INVENTION

Example embodiments of the present invention and their advantages are best understood by referring now to FIGS. 1 through 6C of the drawings, in which like numerals refer to like parts.

Figure 1:
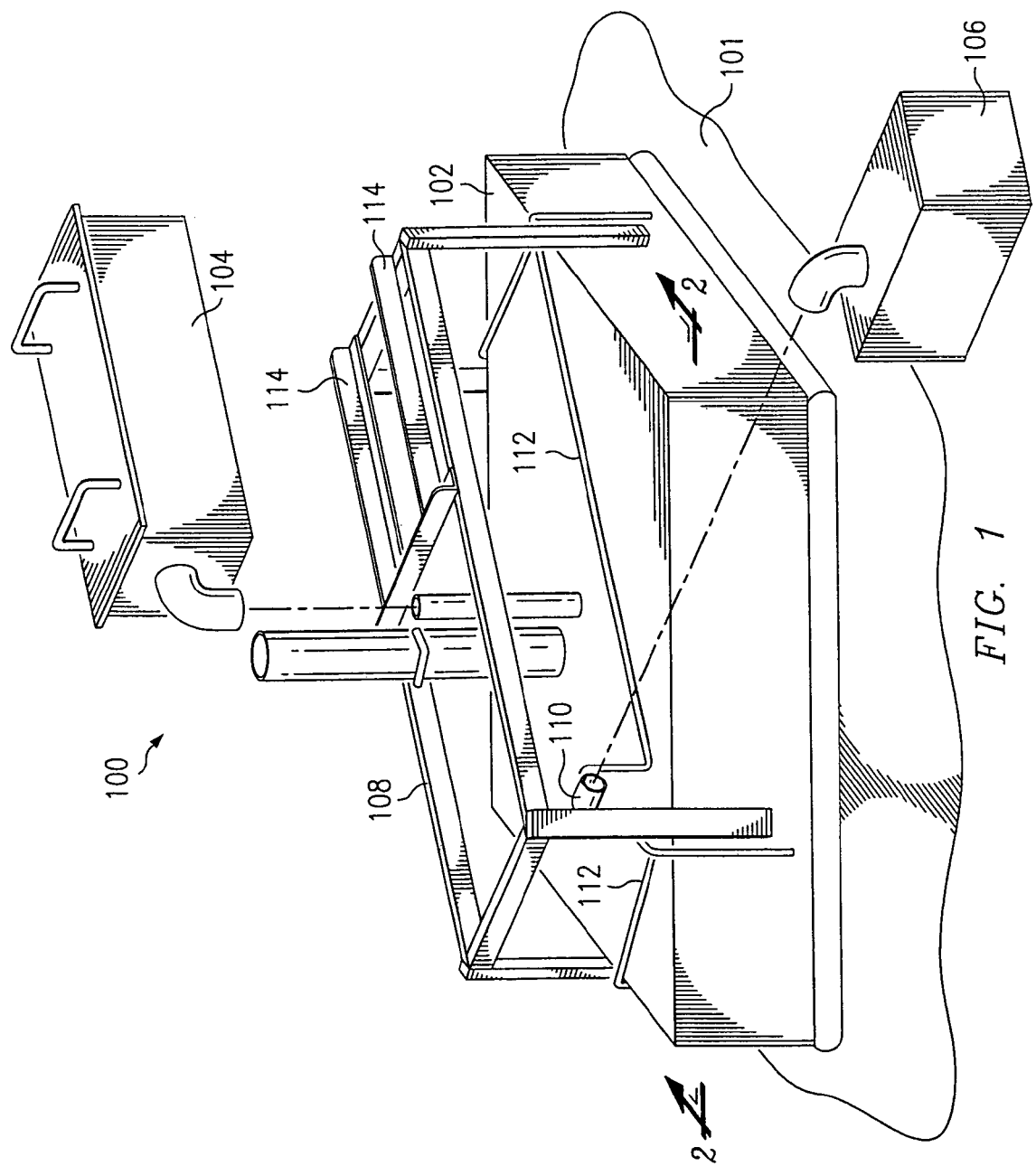
FIG. 1 is a perspective view of a system for on-aircraft material cures according to one embodiment of the present invention.

FIG. 1 is a perspective view of a system 100 for on-aircraft material cures of a composite structure 101 according to one embodiment of the present invention. System 100 includes an oven 102, a hot air supply system 104, a cold air supply system 106, and a handling structure 108. According to the teachings of the present invention, system 100 is a portable, relatively lightweight system that is capable of achieving high curing temperatures for composite materials in aircraft, vehicles, and other structures for long periods of time, while maintaining safe surface temperatures and exhaust gas temperatures for the oven. An important technical advantage of some embodiments of the present invention is that system 100 significantly reduces costs associated with having to disassemble an aircraft or other vehicle for repairs and eliminates the problems of having to use prior systems for curing composite materials.

Composite structure 101 is described herein as being a portion of an aircraft; however, composite structure 101 may be a portion of other vehicles or other suitable structures that employ composite structures in their fabrication. Composite structure 101 typically consists of a composite material. However, composite structure 101 may also have various coatings on its surface that need to be repaired. When repairing structures having composite materials, such as composite structure 101, one processing step that is typically required is an elevated temperature curing step. System 100 performs this high temperature curing step in a safe, reliable, and cost-efficient manner.

Oven 102 is described in greater detail below in conjunction with FIGS. 2 through 6C. In general, oven 102 impinges superheated dry air onto a surface of composite structure 101 for the purpose of curing the composite material associated with composite structure 101. Although oven 102 is illustrated in FIG. 1 to have a generally rectangular shape, other suitable shapes are possible depending on the application for system 100 and the size and configuration of composite structure 101 that is being repaired. According to the teachings of one embodiment of the present invention, oven 102 is capable of reaching and sustaining temperatures of 600° F. or more for long periods of time to facilitate the curing of composite material associated with composite structure 101; however, other temperatures may be utilized. Oven 102 accomplishes this in a manner that meets various safety requirements and avoids injury to maintenance personnel.

Hot air supply system 104 supplies superheated dry air to oven 102. Any suitable hot air supply system may be utilized. For example, one such hot air supply system is a Moen Gas Heating Console, Model No. HT253, manufactured by Heat Transfer Technologies. Another example is a portable compressed air heating system described in U.S. Pat. No. 6,018,614. Hot air supply system 104 may have any suitable size, shape, or power requirements. Hot air supply system 104 couples to oven 102 in any suitable manner.

Cold air supply system 106 functions to supply cold dry air to oven 102 for the purpose of cooling the hot exhaust gasses before the gases exit oven 102. Any suitable cold air supply system may be utilized, such as typical shop air found in any suitable manufacturing plant. The cold air supplied by cold air supply system 106 is regulated by a pressure regulator 110. One or more cold air conduits 112 transport the cold air from pressure regulator 110 to various locations on oven 102, as described in more detail below in conjunction with FIG. 5.

Handling structure 108 is any suitable structural configuration that allows maintenance personnel to handle oven 102. Handling structure 108 may also function to support hot air supply system 104 and/or cold air supply system 106 and their associated components. For example, as shown in FIG. 1, handling structure 108 has a plurality of angle irons 114 configured to accept hot air supply system 104. Any suitable arrangement of handling structure 108 may be utilized depending on the equipment available to handle oven 102 and the shape and/or configuration of oven 102.

Figure 2:
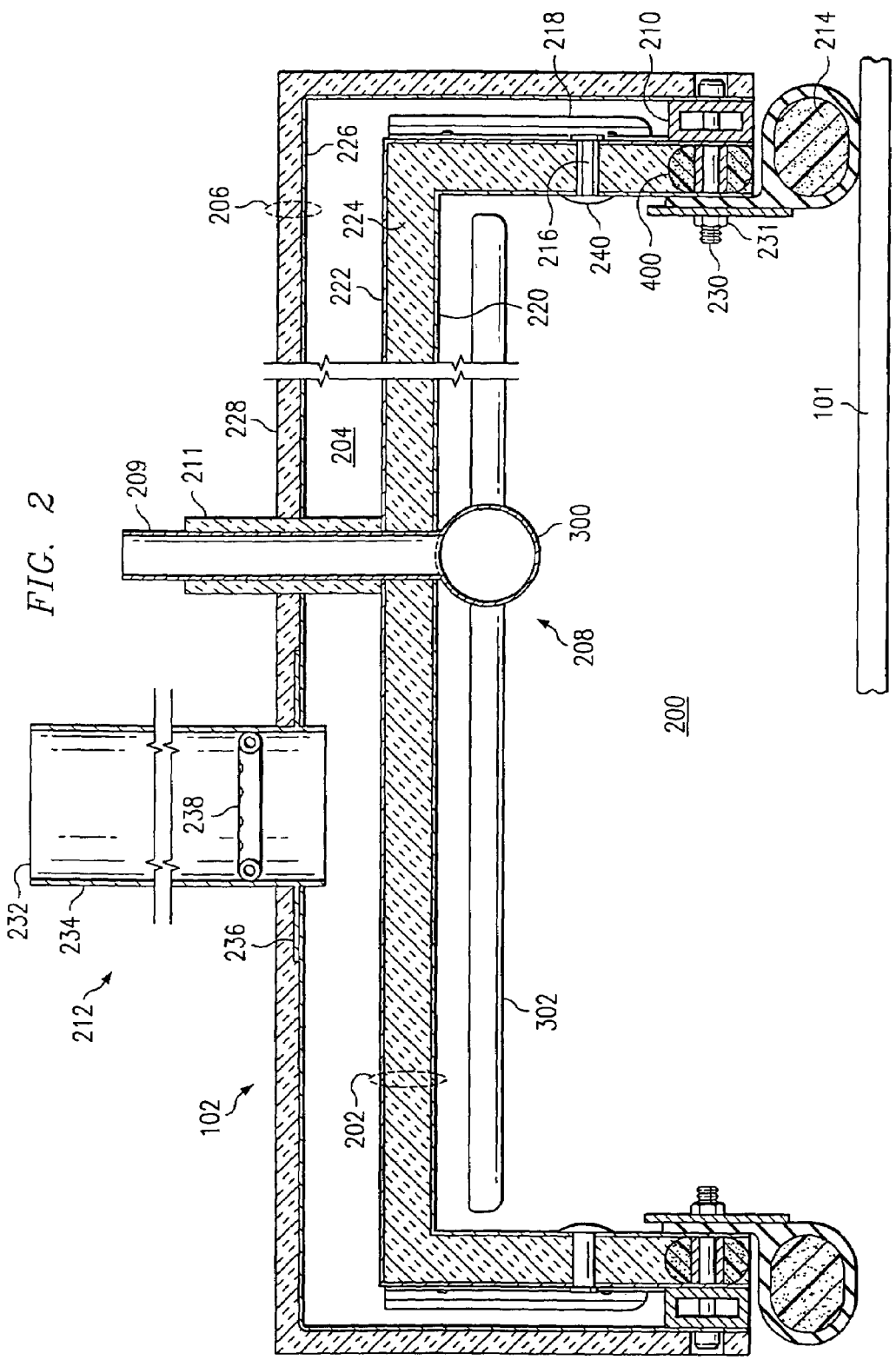
FIG. 2 is a cross-sectional view of an oven of the system of FIG. 1.

FIG. 2 is a cross-sectional view of oven 102 illustrating additional details of oven 102. Oven 102 includes an inner chamber 200, an inner wall 202, an outer chamber 204, and an outer wall 206 that collectively define the general shape of oven 102. Oven 102 further includes a hot air distribution manifold 208, a cold air distribution manifold 210, an exhaust chimney 212, a seal 214, a plurality of hot air exhaust passages 216, and a plurality of hot air exhaust guide plates 218. Handling structure 108 is not shown in FIG. 2 for clarity of description purposes.

Inner chamber 200 is where superheated dry air performs its function to cure composite material of composite structure 101. A configuration and a volume of inner chamber 200 is defined by an inner box 220. Accordingly, inner chamber 200 may have any suitable volume in any suitable configuration. In the illustrated embodiment, inner chamber 200 has a generally rectangular configuration with a depth of approximately five inches. However, inner chamber 200 may have any suitable configuration and any suitable depth depending on the surface area of composite structure 101 that is being repaired along with the amount of hot air and temperature of hot air entering inner chamber 200. In one embodiment, inner chamber 200 is maintained at a temperature of approximately 600° F.; however, inner chamber 200 may be maintained at lower or higher temperatures depending on the type of composite material that is being cured in composite structure 101. Inner box 220 is a thin sheet of metal or other suitable material that defines the volume and configuration of inner chamber 200, as described above. In one embodiment, inner box 220 is formed from stainless steel having a thickness of approximately 0.032 inches. However, other suitable materials having any suitable thickness may be used to form inner box 220.

Inner wall 202 of oven 102 includes inner box 220, an intermediate box 222, and an insulation 224 disposed therebetween. Inner wall 200 functions to insulate outer chamber 204 from inner chamber 200 so that outer chamber 204 is maintained at an adequate temperature, as described further below. Inner wall 202 has a configuration that conforms to the general configuration of oven 102; however, other suitable configurations may be utilized. Intermediate box 222 is a thin sheet of metal or other suitable material that typically has the same general shape as inner box 220. In one embodiment, intermediate box 222 is formed from aluminum having a thickness of approximately 0.032 inches. However, other suitable materials having any suitable thickness may be used to form intermediate box 222. Insulation 224, which may be disposed between inner box 220 and intermediate box 22 in any suitable manner, may be formed from any suitable insulation having any suitable thickness. In a particular embodiment, insulation 224 is formed from saffill insulation having a thickness of approximately 1¼ inch before being compressed between inner wall 220 and intermediate wall 222 to a thickness of ⅝ inch. Inner wall 202 also includes hot air exhaust passages 216 spaced around a wall thereof, as described in further detail below. Inner wall 202 also includes a fiberglass rope 400 disposed around a perimeter thereof. Fiberglass rope 400, and other details of inner wall 202, are described in more detail below in conjunction with FIG. 4.

Outer chamber 204 is the space that is defined by intermediate box 222 and an outer box 226. Outer chamber 204 accepts hot air from inner chamber 200 that is exhausted through hot air exhaust passages 216 and also accepts cold air from cold air distribution manifold 210 and transports the mixed hot and cold air to exhaust chimney 212. Outer chamber 204 typically has the same general shape as oven 102; however, outer chamber 204 may have other suitable shapes. Outer box 226 may be formed from any suitable material having any suitable thickness. In a particular embodiment, outer box 226 is formed from 0.05 inch thick aluminum. Outer chamber 204 also includes hot air exhaust guide plates 218 that accept the hot air from inner chamber 200. Details of hot air exhaust guide plates 218 are described below in conjunction with FIGS. 6A through 6C.

Outer wall 206 comprises the outer wall of oven 102. Outer wall 206 includes outer box 226 and an insulation 228. Insulation 228, which may be coupled to outer box 226 in any suitable manner, may be formed from any suitable insulation having any suitable thickness. In a particular embodiment, insulation 228 is formed from Nomex™ felt having a thickness of approximately 5/16 inch and attached to outer box 226 using a 46146 gray silicon adhesive as a bonding agent. Depending on the combination of the type of insulation used and its thickness, an important consideration is the outside surface temperature of insulation 228. For example, since the outside surface of insulation 228 is exposed to maintenance personnel, then its surface temperature should be at a safe temperature so that maintenance personnel do not get injured. For example, in one embodiment, a maximum outside surface temperature of insulation 228 is approximately 140° F. Federal and/or company safety standards may mandate that the surface temperature of insulation 228 be at a lower temperature.

Hot air distribution manifold 208 receives superheated dry air from hot air supply system 104 (FIG. 1) via a hot air supply tube 209 and delivers the superheated dry air into inner chamber 200, as described in more detail below in conjunction with FIG. 3.

FIG. 3 is a bottom plan view illustrating additional details of hot air distribution manifold 208. As illustrated, hot air distribution manifold 208 includes a plenum 300 and a plurality of dispersion tubes 302 having a plurality of holes 304 formed therein. Superheated dry air enters plenum 300 via hot air supply tube 209. The superheated dry air entering hot air distribution manifold 208 is pressurized at any suitable pressure. In one embodiment, the pressure of the superheated dry air is between approximately 10 and 30 psi. The superheated dry air is distributed to each of the dispersion tubes 302 so that the superheated dry air may enter inner chamber 200 via holes 304. The overall configuration of hot air distribution manifold 208 as shown in FIG. 3 is only one of many configurations that are possible. The configuration of hot air distribution manifold 208 is determined by the configuration of oven 102 and/or the surface area of composite structure 101 that is being repaired. Both plenum 300 and dispersion tubes 302 may be formed from any suitable material having any suitable configuration. In one embodiment, both plenum 300 and dispersion tubes 302 are formed from metal tubes, such as stainless steel tubes. In a particular embodiment, plenum 300 is formed from a 1¼ inch diameter stainless steel tube having a 0.035 inch thick wall and dispersion tubes 302 are formed from a ⅜ inch diameter stainless steel tube having a 0.035 inch thick wall.

Holes 304 are selected so that superheated dry air is evenly dispersed and impinged on the surface of composite structure 101. As an example, holes 304 have a 0.05 inch diameter; however, other suitably sized orifices may be utilized. In addition, any suitable number of holes 304 may be utilized. Both the number and diameter of holes 304 are based on both the surface area of composite structure 101 that is being repaired and the amount of hot air that is entering hot air distribution manifold 208.

Referring back to FIG. 2, hot air distribution manifold 208 is coupled to oven 102 via hot air supply tube 209 in any suitable manner. Hot air supply tube 209 may be formed from any suitable material. In one embodiment, hot air supply tube 209 is formed from a ¾ inch diameter stainless steel tube having a wall thickness of 0.058 inches. In addition, hot air supply tube 209 may be wrapped with an insulation 211. Insulation 211 may have any suitable thickness and may be formed from any suitable material, such as a fiberglass material.

Cold air distribution manifold 210 is disposed within outer chamber 204 around a perimeter of oven 102 near the open bottom of oven 102. The function of cold air distribution manifold 210 is to deliver cold air into outer chamber 204 so that it may mix with the hot air from inner chamber 200 before exhausting out exhaust chimney 212. In the illustrated embodiment, cold air distribution manifold 210 is formed from rectangular tubing, which may be any suitable material having any suitable wall thickness. In one embodiment, cold air distribution manifold is formed from 1 inch×½ inch×⅛ inch wall rectangular tubing. Additional details of cold air distribution manifold 210 are described below in conjunction with FIG. 5.

Exhaust chimney 212 includes a tube 232 wrapped by an insulation 234. Exhaust chimney 212 may also have a flange 236 and a cold air distribution manifold 238. Exhaust chimney 212 functions to exhaust mixed hot air and cold air from outer chamber 204 to the atmosphere. An important technical advantage of some embodiments of the present invention is that the air exhibiting exhaust chimney 212 is at a relatively safe temperature. For example, a temperature of air exhausting from exhaust chimney 212 is at a maximum temperature of 350° F. In addition, a length of exhaust chimney 212 is such that the air exhausts at a suitable distance above outer wall 206 of oven 102. Generally, the height of exhaust chimney 212 is determined by federal and/or company safety standards.

In one embodiment, tube 232 is formed from two inch diameter 6061-T6 aluminum having a wall thickness of 0.049 inches; however, tube 232 may be formed from any suitable material having any suitable shape and suitable wall thickness. Insulation 234 may be any suitable insulation having any suitable thickness. In one embodiment, insulation 234 is formed from fiberglass. Exhaust chimney 212 may be coupled to oven 102 in any suitable manner. In the illustrated embodiment, exhaust chimney 212 is coupled to outer box 226 of outer wall 206 via flange 236. Flange 236 may be coupled to outer box 226 by riveting, bolting, welding, or other suitable methods. Cold air distribution manifold 238 may be used in some embodiments to inject additional cold air directly into exhaust chimney 212 for the purpose of cooling exhaust gasses from outer chamber 204 before exiting into the atmosphere. The amount of cold air entering exhaust chimney 212 from cold air distribution manifold 238 may be controlled by pressure regulator 110 (FIG. 1). Cold air distribution manifold 238 may be coupled inside exhaust chimney 212 using any suitable methods.

Seal 214 extends around a perimeter of oven 102 in order to facilitate the sealing of oven 102 to composite structure 101 so that hot air within inner chamber 200 may not escape. Seal 214 may be formed from any suitable material. In one embodiment, seal 214 is formed from fiberglass rope and wrapped with a thick fiberglass tape and sewn into a suitable shape for easy installation. Seal 214 couples to oven 102 as described below in conjunction with FIG. 4. The configuration and type of seal 214 is chosen based on the contour of composite structure 101 so the proper sealing may take place.

Hot air exhaust passages 216 facilitate the exhausting of hot air inside inner chamber 200 into outer chamber 204. Hot air exhaust passages 216 are formed in inner wall 202 and approximately equally spaced around inner wall 202. Hot air exhaust passages 216 may have any suitable size and shape; however, in one embodiment, hot air exhaust passages 216 are formed by utilizing a plurality of hollow rivets 240, as illustrated. Hollow rivets 240 may be formed from any suitable material, such as aluminum. The number and size of hot air passages 216 depend on how much air is entering inner chamber 200 via hot air distribution manifold 208. The total area of hot air exhaust passages 216 is greater than or equal to the total area of holes 304 of hot air distribution manifold 208 so that proper exhausting may occur. In one embodiment, a total area of hot air exhaust passages 216 is one to one and a half times the total area of holes 304 of hot air distribution manifold 208. However, other suitable ratios may be utilized.

Hot air exhaust guide plates 218 function to accept hot air traveling through hot air exhaust passages 216 and transport the hot air to outer chamber 204 so that it may mix with cold air coming from cold air distribution manifold 210. Hot air exhaust guide plates 218 may be coupled to intermediate box 222 of inner wall 202 in any suitable manner, such as riveting, bolting, welding, or other suitable methods. Details of hot air exhaust guide plates 218 are described below in conjunction with FIGS. 6A through 6C.

Figure 4:
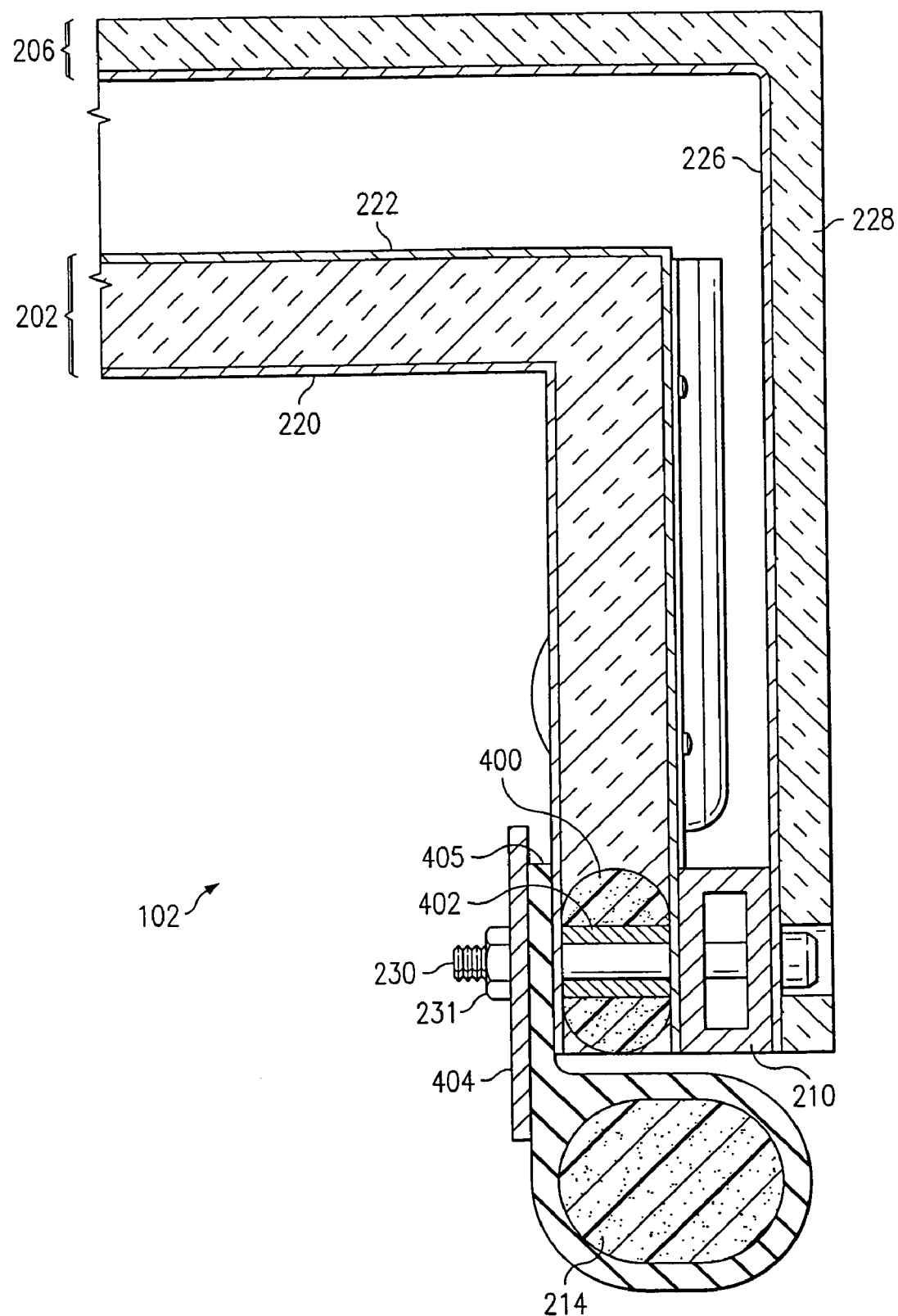
FIG. 4 is an enlarged view of a side of the oven of FIG. 2 showing additional details of the oven.

FIG. 4 is an enlarged view of a portion of oven 102 showing details of oven 102 in greater detail. As illustrated, inner wall 202 and outer wall 206 are coupled together via a bolt 230 and a nut 231. This coupling is facilitated by having a hollow spacer 402 disposed within fiberglass rope 400 and having openings formed in cold air distribution manifold 210. Therefore, when bolt 230 is installed, bolt 230 is disposed through openings in insulation 228, outer box 226, cold air distribution manifold 210, intermediate box 222, spacer 402, inner box 220, seal 214, and a titanium plate 404. Both bolt 230 and nut 231 may be formed from any suitable material. For example, bolt 230 may be a 3/16 inch diameter 1½ inch long aluminum bolt.

Spacer 402, in one embodiment, is a hollow aluminum tube that is disposed within fiberglass rope 400 and extends from inner box 220 to intermediate box 222. Other suitable materials and components may be used as spacer 402. If spacer 402 is a hollow tube, it may have any suitable diameter, such as 5/8 of an inch. As described above, fiberglass rope 400 is installed between inner box 220 and intermediate box 222 around a perimeter of inner wall 202. After installing fiberglass rope 400, a 46146 gray silicone adhesive or other suitable adhesive is applied thereto to retain fiberglass rope 400 therein.

Titanium plate 404 extends around the perimeter of oven 102 adjacent to inner box 220 and functions to retain seal 214 in position. As illustrated, seal 214 may have a tail 405 that is sandwiched between titanium plate 404 and inner box 220. Nut 231 performs this function. Titanium plate 404 may have any suitable thickness and may be formed from other suitable materials other than titanium.

Figure 5:
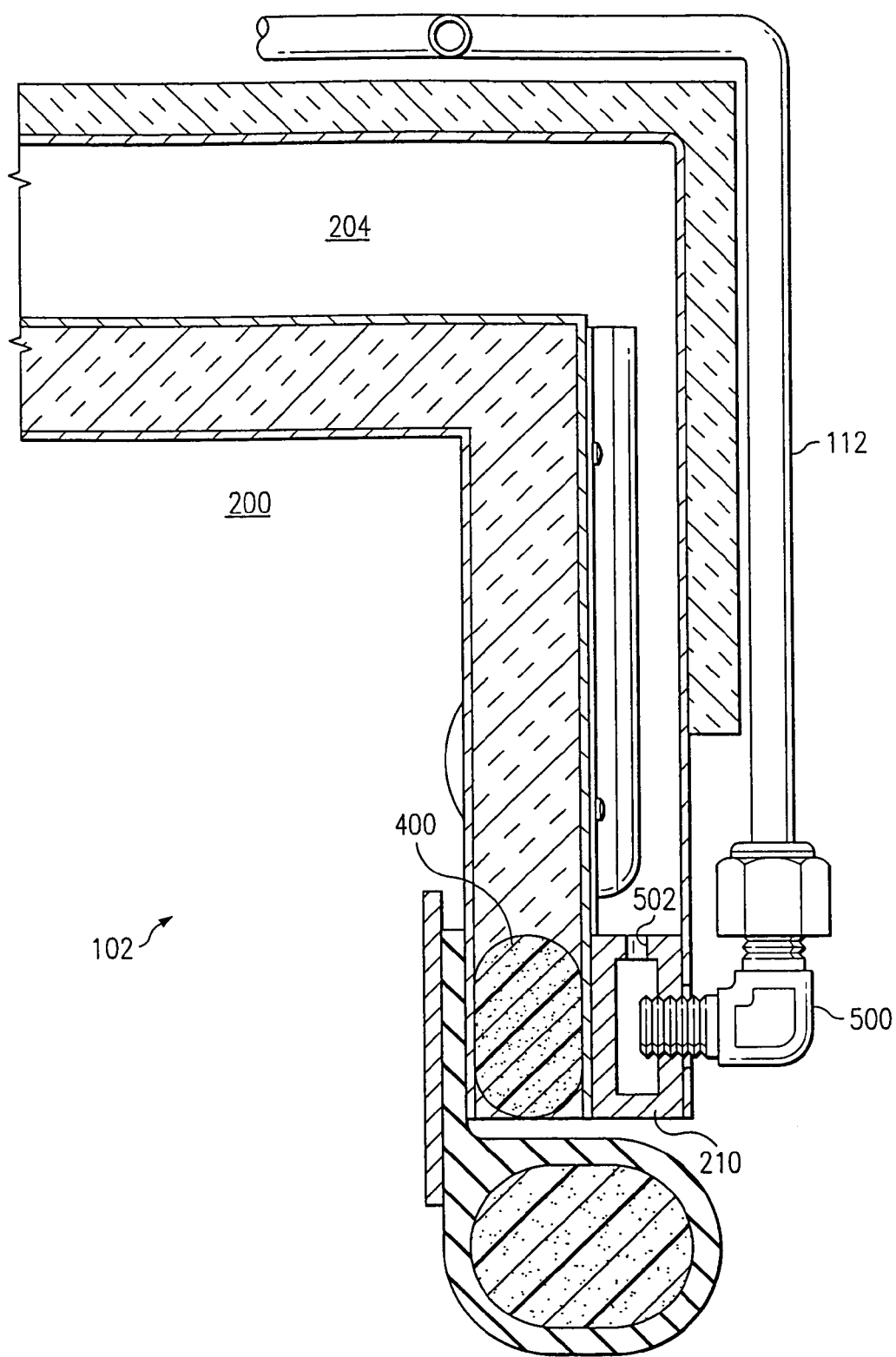
FIG. 5 is an enlarged view of a side of the oven of FIG. 2 showing the coupling of the oven to a cold air supply system.

FIG. 5 is an enlarged view of a portion of oven 102 showing the details of how cold air is injected into outer chamber 204 via cold air distribution manifold 210. The cross section illustrated in FIG. 5 is at a different location around the perimeter of oven 102 than that of FIG. 4. At this location, cold air travels through cold air line 112 through one or more fittings 500 and into cold air distribution manifold 210. A plurality of approximately equally spaced holes 502 are formed in a top side of cold air distribution manifold 210 so that the cold air may enter into outer chamber 204 and eventually mix with hot air from inner chamber 200. The cold air is regulated by pressure regulator 110 (FIG. 1) and may have any suitable temperature. Typically, atmospheric temperature is used; however, cooler temperatures or warmer temperatures may also be utilized. The cold air may be pressurized to a pressure anywhere from 2½ to 10 psi.

Holes 502 are spaced around the perimeter of cold air distribution manifold 210 in any suitable manner. In one embodiment, a spacing of one inch is used. In addition, any suitable diameter may be used for holes 502. In one embodiment, holes 502 are #40 holes, which mean their diameter is approximately 0.098 inches. The cold air entering outer chamber 204 is typically shop air that is dry and at ambient temperature.

FIGS. 6A–6C illustrate one embodiment of hot air exhaust guide plates 218. As illustrated, hot air exhaust guide plate 218 is formed from a flat piece of metal having a trough 600 formed therein to form a passageway for hot air coming from inner chamber 200. In one embodiment, hot air exhaust guide plate 218 is formed from aluminum having a thickness of 0.020 inches. However, other suitable materials and thickness may be utilized. Trough 600 may have any suitable length and is typically of a length that avoids hot spots on outer box 226. In other words, hot air entering into trough 600 from inner chamber 200 does not impinge directly on outer box 226 but travels upward through trough 600 before mixing with cold air in outer chamber 204. Hot air exhaust guide plate 218 may be coupled to intermediate box 222 in any suitable manner, such as riveting, welding, or bolting.

In operation of system 100, and with reference to FIG. 2, oven 102 is placed upon a surface of composite structure 101 to facilitate the curing of composite material of composite structure 101. Handling structure 108 is used by maintenance personnel to position oven 102 onto the surface of composite structure 101. Maintenance personnel ensure that a good seal is maintained between seal 214 and the surface of composite structure 101. Both hot air supply system 104 and cold air supply system 106 and their associated plumbing are then appropriately connected to oven 102. For example, hot air supply system 104 is coupled to hot air supply tube 209 and cold air supply system 106 is coupled to pressure regulator 110 (FIG. 1).

Thereafter, super heated dry air is supplied to hot air distribution manifold 208. The superheated dry air is impinged on the surface of composite structure 101 via holes 304 of dispersion tubes 302. Once the desired curing temperature is obtained, it is held for a predetermined amount of time. During the cure process, hot air exhausts through hot air exhaust passages 216 into outer chamber 204 where it mixes with cold air coming from cold air distribution manifold 210. This mixed hot and cold air travels through outer chamber 204 until reaching exhaust chimney 212 where additional cold air is injected via cold air distribution manifold 238 to further cool the exhaust gases before exiting oven 102.

The superheated dry air is pressurized to a pressure of between 10 and 30 psi and the cold air is pressurized to a pressure of between 2½ to 10 psi. The combination of insulation 224, cold air from cold air distribution manifold 210, and insulation 228 keeps an outer surface of insulation 228 at a suitable temperature to avoid injury to maintenance personnel. In addition, hot air exhaust guide plates 218 prevent any hot spots on an outside surface of insulation 228 around the sides of oven 102. After composite structure 101 is sufficiently cured, both hot air supply system 104 and cold air supply system 106 may be shut off and oven 102 removed from composite structure 101 so that oven 102 may be moved to another place and used to cure other composite structures. The portability and light weight of oven 102 facilitates easy and rapid curing of composite structures in a cost efficient manner.

Although embodiments of the invention and their advantages are described in detail, a person skilled in the art could make various alterations, additions, and omissions without departing from the spirit and scope of the present invention as defined by the appended claims.

What is claimed is:

1. A method for curing a composite material, comprising:
providing an oven, the oven comprising:
an inner wall defining an inner chamber;
an outer wall, the outer wall and the inner wall defining an outer chamber therebetween;
a hot air distribution manifold disposed within the inner chamber; and
a cold air distribution manifold disposed within the outer chamber;
disposing the oven adjacent the material such that a perimeter of the inner wall surrounds the composite materials;
supplying hot air to the hot air distribution manifold via a hot air supply system;
directing the hot air towards the composite materials;
providing a plurality of hot air exhaust passages in the inner wall so that the hot air moves from the inner chamber to the outer chamber;
supplying cold air to the cold air distribution manifold via a cold air supply system;
mixing the hot air with the cold air in the outer chamber;
directing the mixed hot air and cold air to an exhaust chimney coupled to the outer wall;
disposing a cold air distribution conduit inside the exhaust chimney; and
supplying cold air to the cold air distribution conduit via the cold air supply system.

2. The method of claim 1, further comprising disposing an insulative seal around the perimeter of the inner wall before disposing the oven adjacent the composite material.

3. The method of claim 2, further comprising:
extending a retaining plate around an inside of the inner chamber adjacent the perimeter;
coupling the inner wall and the outer wall with a bolt and a nut; and
retaining the insulative seal between the retaining plate and the inside of the inner chamber.

4. The method of claim 1, further comprising coupling a plurality of hot air guide plates to the inner wall within the outer chamber, and directing, via the hot air guide plates, the hot air received from the hot air exhaust passages in the outer chamber.

5. The method of claim 1, wherein the inner wall comprises a first insulation disposed between an inner box and an intermediate box, and wherein the outer wall comprises a second insulation disposed on an outside surface of an outer box.

6. The method of claim 5, further comprising selecting a thickness of the first insulation and selecting a thickness of the second insulation such that a surface temperature of an outside of the second insulation is no more than 140 degrees Fahrenheit when the inner chamber is at a temperature of at least 500 degrees Fahrenheit.

7. The method of claim 5, further comprising disposing an insulative rope between the inner box and the outer box adjacent the first insulation and extending the insulative rope around the perimeter of the inner wall.

8. The method of claim 1, further comprising:
providing the hot air distribution manifold with a plenum having a plurality of dispersion tubes; and
providing each dispersion tube with a plurality of orifices.

9. The method of claim 8, further comprising providing a ratio of a total area of the hot air exhaust passages to a total area of the orifices equal to at least one.

10. The method of claim 1, wherein the hot air supplied via the hot air supply system is superheated dry air and the cold air supplied via the cold air supply system is cold dry air.

* * * * *